United States Patent

Camp, Jr. et al.

[15] 3,639,845
[45] Feb. 1, 1972

[54] COMPENSATING THRESHOLD LEVEL DETECTOR

[72] Inventors: Arthur F. Camp, Jr., Redington Beach, Fla.; Harry W. Getz, Phoenix, Ariz.

[73] Assignee: General Electric Company

[22] Filed: Nov. 19, 1970

[21] Appl. No.: 91,031

[52] U.S. Cl. ........................... 328/146, 307/235, 328/115, 328/162
[51] Int. Cl. ........................ H03b 3/02, H03k 5/20
[58] Field of Search .............................. 307/235; 328/115–117, 127, 146, 162, 164, 175; 325/65; 178/63 E, 69 A

[56] References Cited

UNITED STATES PATENTS

| | | | |
|---|---|---|---|
| 3,105,939 | 10/1963 | Onno et al. | 328/146 X |
| 2,307,375 | 1/1943 | Blumlein et al. | 178/69 A |

*Primary Examiner*—John Zazworsky
*Attorney*—Raymond H. Quist, Allen E. Amgott, Henry W. Kaufmann, Frank L. Neuhauser, Oscar B. Waddell and Joseph B. Forman

[57] ABSTRACT

A circuit including a comparator for indicating when an input voltage crosses a threshold voltage. Compensation for input signal droop is provided by causing a controlled droop of both the input signal and the threshold, thereby avoiding erroneous threshold crossings.

2 Claims, 3 Drawing Figures

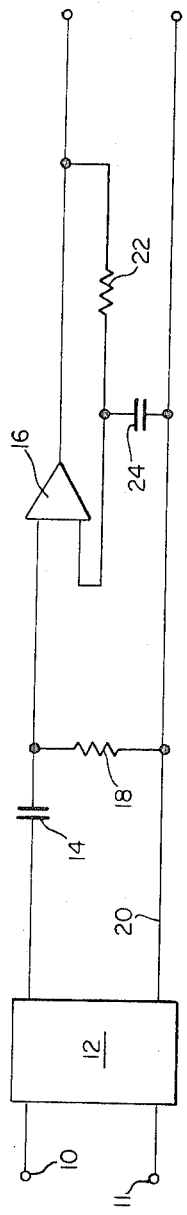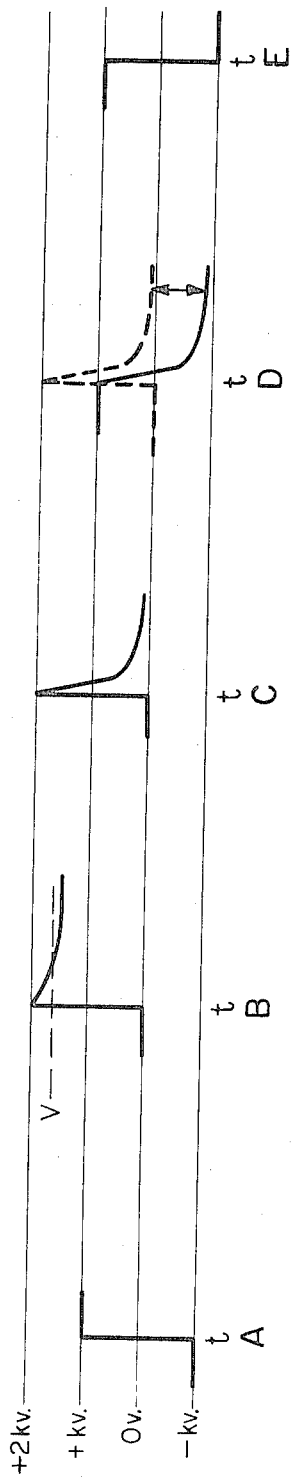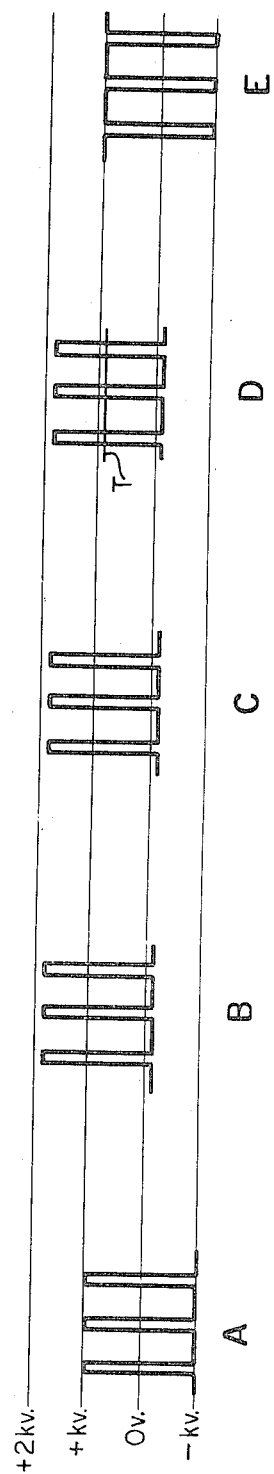
INVENTOR.
ARTHUR F. CAMP, JR.
HARRY W. GETZ
ATTORNEY.

COMPENSATING THRESHOLD LEVEL DETECTOR

BACKGROUND OF THE INVENTION

This invention relates to a detector for indicating that the signal from a two-state voltage source has reached a predetermined voltage level. The detector compensates for the distortion of digital signals passed through devices which are not direct current coupled.

The resistance-capacitance coupling utilized in many AC circuits and devices causes distortion of binary voltage signals passed through them. If, for example, binary voltages which are symmetrical about zero are passed through an AC circuit, the output will assume an initial voltage level and then droop (generally exponentially) toward a final value. This final value is the quiescent output voltage of the device. Nonreturn to zero digital signal are particularly susceptible to this type of distortion when they are passed through AC amplifiers or analog recorders. If a standard level detector is used to detect nonreturn to zero signals coming from these devices, erroneous data indications would occur as a result of the voltage droop.

SUMMARY

In a preferred from of the invention, a comparator has as one input a reference voltage establishing a threshold, and as a second input an input signal nominally at one of two levels. Where the input signal derives from an AC circuit it tends to droop from the nominal level towards, and possibly through, the threshold. A first R-C network is used in this invention to intensify this droop of the input signal, and a second R-C network having the same time constant is used to cause a similar droop in the threshold. Thus the input signal only crosses the threshold when it changes from one level to the other.

BRIEF DESCRIPTION OF THE DRAWINGS

FIG. 1 is a schematic circuit diagram of one embodiment of the invention;

FIG. 2 is a graph illustrating the signals at various points in the FIG. 1 circuit; and FIG. 3 is a graph illustrating a low-duty pulse train at various points in the FIG. 1 circuit.

DESCRIPTION OF THE PREFERRED EMBODIMENT

Referring to FIGS. 1 and 2, a voltage step, such as that shown in FIG. 2A, is applied to terminal 10 with respect to terminal 11. The signal passes through an AC circuit or device 12 employing resistance-capacitance coupling and is distorted. Device 12 does not form a part of the present invention, and for the purpose of this explanation will be considered to be an AC amplifier.

The signal leaving AC amplifier 12 has the form shown in FIG. 2B. The output jumps at time $t$, and then droops toward zero voltage level. The form of the droop closely approximates an exponential decay and depends on the overall R-C time constant of AC amplifier 12. If a comparator or level detector with its threshold level set at voltage level V in FIG. 2B were employed, it can be seen that the threshold level would be crossed as the signal level dropped. (The problem is not solved by setting the threshold level closer to the zero volts, since noise would then become the source of erroneous data.)

In accordance with the invention, the signal leaving AC amplifier 12 is applied first to a resistance-capacitance network comprised of capacitor 14 connected between AC amplifier 12 and one input terminal of differential comparator 16, and resistor 18 with one terminal connected to the junction of comparator 16 and capacitor 14, and the other terminal connected to reference line 20. Resistor 18 and capacitor 14 are chosen so that the R-C time constant will be shorter than that of amplifier 12 and, therefore, will be the dominant time constant. In this manner the voltage droop can be controlled to have a waveform such as that illustrated in FIG. 2C.

The signal of FIG. 2C is applied as one of two inputs to differential comparator 16. Differential comparator 16, in this case, is being employed as a threshold level detector. The second input to comparator 16 is a reference signal which in the usual circuit arrangement would provide a fixed reference voltage or threshold level. In this instance, however, it is desired to avoid a fixed threshold level with the attendant false data readings which can result from drooping voltage characteristics. The solution presented is to feed back the comparator output through a second resistance-capacitance network comprised of resistor 22 and capacitor 24. By selecting the second R-C network to have the same time constant as the first, the step output of comparator 16 shown in FIG. 2E is modified to the form shown in FIG. 2D (by the solid line), where it is compared with the signal modified by the first R-C network. It will be observed that the vertical displacement between the two waveforms is constant at any point in time after time $t$. In other words, the threshold level is caused to droop to the same extent as the signal input so that only when the input signal changes level (as opposed to drooping) will a change in the comparator output occur.

Referring to FIG. 3, compensation for DC drift occurring in a pulse train having a low duty cycle is illustrated. As a result of the coupling capacitor of amplifier 12, as well as capacitor 14, the voltage pulses tend to have an equilibrium position about the zero voltage level with the area of the positive portion equal to the area of the negative portion. Without compensation and with the threshold at comparator 16 set at 0 volts, it is evident that a small amount of noise would cause erroneous output data. The feedback arrangement of resistor 22 and capacitor 24 causes the threshold voltage T to be at the level indicated in FIG. 3D.

While a particular embodiment of a compensating threshold level detector has been shown and described, it will be obvious that changes and modifications can be made without departing from the spirit of the invention or the scope of the appended claims.

We claim:

1. In combination with a differential comparator having a signal voltage input terminal, a reference voltage input terminal for producing a threshold level and an output terminal, wherein said comparator produces a change in its output voltage when the voltage level of the signal input crosses threshold level, a compensation circuit to avoid erroneous output signals arising from input signal droop comprising;
    means for inducing in the input signal a controlled signal droop greater than the inherent signal droop; and
    means for causing a controlled droop in the threshold level to the same extent as that of the signal input; whereby said comparator output will only change with a change in the input signal level.

2. In combination with a differential comparator having a signal voltage input terminal, a reference voltage input terminal, and an output terminal, wherein said comparator produces a change in its output voltage when the voltage level of the signal input crosses that of the reference input, a compensation circuit to avoid erroneous output signals arising from input signal droop comprising:
    a signal carrying line;
    a reference line;
    a first capacitor having one terminal connected to said signal carrying line, and the other terminal connected to said comparator signal voltage input terminal;
    a first resistor having one terminal connected to said other terminal of said first capactitor, and the other terminal connected to said reference line;
    a second resistor having one terminal connected to the output terminal of said comparator, and the other terminal connected to said comparator reference voltage input terminal;
    a second capacitor having one terminal connected to said other terminal of said second resistor, and the other terminal connected to said reference line; and the time constant of said second resistor and second capacitor being the same as that of said first resistor and first capacitor.

* * * * *